(12) United States Patent
Cogen et al.

(10) Patent No.: US 8,689,653 B2
(45) Date of Patent: *Apr. 8, 2014

(54) PIPELINE INSPECTION APPARATUS AND METHOD USING RADIO FREQUENCY IDENTIFICATION AND INERTIAL NAVIGATION

(76) Inventors: William Cogen, Irvine, CA (US); Michael Burz, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,280

(22) Filed: Jul. 26, 2011

(65) Prior Publication Data

US 2011/0282591 A1    Nov. 17, 2011

Related U.S. Application Data

(62) Division of application No. 12/017,813, filed on Jan. 22, 2008, now Pat. No. 8,001,858.

(60) Provisional application No. 60/881,179, filed on Jan. 19, 2007.

(51) Int. Cl.
*E21B 23/08*    (2006.01)

(52) U.S. Cl.
USPC ........................................... 73/865.8

(58) Field of Classification Search
None
See application file for complete search history.

(56) References Cited

U.S. PATENT DOCUMENTS

| | | |
|---|---|---|
| 5,686,674 A | 11/1997 | Lowry et al. |
| 5,773,984 A | 6/1998 | Suyama et al. |
| 6,098,231 A | 8/2000 | Smith et al. |
| 6,190,090 B1 | 2/2001 | Campbell et al. |
| 6,333,699 B1 | 12/2001 | Zierolf |
| 6,640,655 B1 | 11/2003 | Manzak et al. |
| 6,759,968 B2 | 7/2004 | Zierolf |
| 6,768,959 B2 | 7/2004 | Ignagni |
| 6,792,641 B1 | 9/2004 | Laker |
| 6,826,492 B2 | 11/2004 | Newman |
| 6,931,952 B2 | 8/2005 | Rantala et al. |
| 6,995,677 B2 | 2/2006 | Aronstam et al. |

(Continued)

FOREIGN PATENT DOCUMENTS

JP    07004941 A    10/1995

OTHER PUBLICATIONS

"Trenchless Technology Network: Underground Mapping, Pipeline Location Technology and Condition Assessment",The University of Birmingham, Infrastructure Engineering and Management Research Center, Civil Engineering School of Engineering, Mar. 2002.

*Primary Examiner* — Robert R Raevis
(74) *Attorney, Agent, or Firm* — Barbara Webb Walker

(57) ABSTRACT

A pipeline inspection device, for example a pipeline inspection gauge or pig, is configured for inspecting a pipeline. The pipeline includes a plurality of pipes of varying orientations and a radio frequency identification device (RFID) provided on each pipe. Each RFID contains information indicative of the identity of each respective pipe. The inspection device includes a RF transceiver configured to receive the identity information from each RFID; an inertial navigation unit configured to generate three-space position information indicative of the position of the inspection device in the pipeline; and a processor configured to synchronize the identity information of each RFID with the position information to determine a three-space location of each pipe in the pipeline. A method of inspecting a pipeline that has a plurality of pipes includes collecting identity information indicative of the identity of each pipe; generating three-space position information indicative of the position of each pipe; and synchronizing the identity information and the position information.

9 Claims, 2 Drawing Sheets

(56) References Cited

U.S. PATENT DOCUMENTS

| | | |
|---|---|---|
| 7,000,280 B1 | 2/2006 | Knapp |
| 7,063,148 B2 | 6/2006 | Jabusch |
| 7,526,944 B2 * | 5/2009 | Sabata et al. .................. 73/49.1 |
| 2002/0093431 A1 | 7/2002 | Zierolf |
| 2002/0113869 A1 | 8/2002 | Kirkwood |
| 2002/0156591 A1 | 10/2002 | Newman |
| 2004/0025607 A1 | 2/2004 | Rantala et al. |
| 2004/0239521 A1 | 12/2004 | Zierolf |
| 2005/0076724 A1 | 4/2005 | Boudreaux |
| 2005/0115708 A1 | 6/2005 | Jabusch |
| 2005/0145018 A1 | 7/2005 | Sabata et al. |
| 2005/0248334 A1 | 11/2005 | Dagenais et al. |

* cited by examiner

PIPELINE INSPECTION APPARATUS AND METHOD USING RADIO FREQUENCY IDENTIFICATION AND INERTIAL NAVIGATION

BACKGROUND OF THE INVENTION

1. Field of the Invention

The present invention relates to a pipeline inspection device and to methods for using the device that include radio frequency identification and inertial measuring. The device may be part of a pipeline system that also includes pipes having a radio frequency identification device that communicates with the pipeline inspection device.

2. Description of the Related Art

Toxic materials carried in pipelines, often under pressure, such as oil and gas, can cause corrosion that forms inside the pipes over time. The corrosion weakens the integrity of the pipes, making it more likely that leaks will develop. Damage resulting from the corrosion that forms on the inside of pipes, is not easily visible to inspection teams who must observe the pipelines from the outside. While the pipes look normal, corrosion may have severely compromised the integrity of the pipe and the operation of the entire pipeline. The damage and the resulting leaks of toxic materials, such as gas and oil, is costly for the pipeline owner and/or operator to repair and can cause significant damage to the environment of the area where the pipeline is located.

To prevent oil and gas leaks, pipeline owners and/or operators routinely inspect the pipeline from the inside. This requires stopping the flow of material and sending an inspection device through the pipeline to check it. An inspection device presently used to inspect pipelines is known as a pipeline inspection gauge, or pig. The inspection device may travel very long distances through pipelines located in remote areas, in some instances for hundreds miles. The inspection device collects data from inside the pipeline, for example, data indicating wall thickness, deformation to the pipeline and other corrosion related damage. The device is retrieved from the pipeline following inspection and the collected data is analyzed.

Currently used inspection devices have disadvantages. For example, if an inspection device or pig locates a problem, the information that is collected does not presently provide information that can be useful for maintaining the pipeline, such as: when the pipe with the problem was installed (i.e. how long the pipe has been in service); who installed the pipe; information regarding the source of the pipes on either side of the problem pipe; the exact location of the problem pipe; the manufacturer of the problem pipe; and the date the problem pipe was installed and manufactured.

SUMMARY OF THE INVENTION

According to an embodiment of the invention, an inspection device is provided for inspecting a pipeline. The inspection device comprises a RF transceiver configured to receive the identity information from a radio frequency identification device (RFID) located on an individual piece or section of pipe; an inertial navigation unit configured to generate three-space position information indicative of the position of the inspection device in the pipeline; and a processor configured to synchronize the identity information of the RFID with the position information to determine a three-space location of each pipe in the pipeline. In a further embodiment, the invention may comprompse a pipeline inspection system further comprising a plurality of pipes. In one embodiment, a piece or section of pipe is provided with a RFID that is mounted on an individual pipe or pipe section in the pipeline or on representative pipes located within the pipeline. Each RFID contains information indicative of the identity of each respective pipe.

According to another embodiment of the invention, a method is provided for inspecting a pipeline comprising a plurality of pipes. The method comprises collecting information indicative of the identity of each pipe; generating position information indicative of the three-space position of each pipe; and synchronizing the identity information and the position information.

BRIEF DESCRIPTION OF THE DRAWINGS

Embodiments of the present invention will be discussed with reference to the accompanying drawings, in which like reference numbers denote like features, and wherein FIG. 1 schematically illustrates an inspection device according to the present invention.

DETAILED DESCRIPTION

The present invention relates to an inspection device for inspecting a pipeline, the device comprising an RF transceiver configured to receive the identity information from an RFID associated with a section of pipe; an inertial navigation unit configured to generate three-space position information indicative of the position of the inspection device in the pipeline; and a processor configured to synchronize the identity information of an RFID with the position information to determine a location of each pipe in the pipeline.

A further embodiment of the invention relates to a method of inspecting a pipeline comprising a plurality of pipes, the method comprising: collecting identity information indicative of the identity of each pipe; generating three-space position information indicative of the position of each pipe; and synchronizing the identity information and the position information.

A still further embodiment of the invention relates to a system for monitoring a pipeline comprising: an inspection device for inspecting a pipeline; a pipeline comprising a plurality of pipes of varying orientations; an RFID provided on one or more individual pipes in the pipeline; an RF transceiver configured to receive identity information from the RFID; an inertial navigation unit configured to generate three-space position information indicative of the position of the inspection device in the pipeline; and a processor configured to synchronize the identity information of each RFID with the position information to determine a location of each pipe in the pipeline.

Figure 1:
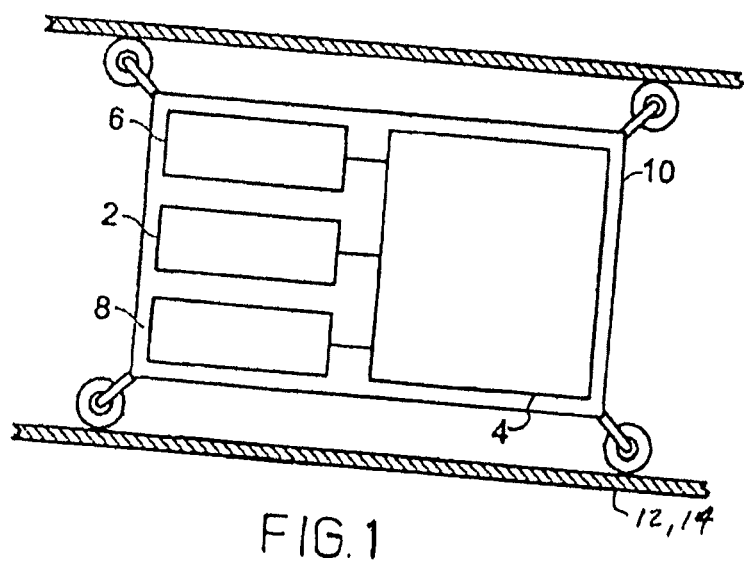

Referring to FIG. 1, an inspection device 10 according to the present invention is placed in a pipeline 12. The device 10 includes a RF transceiver 2 and a processor 4. The processor 4 can be any device capable of executing computer readable instructions, such as a general purpose computer or an application specific integrated circuit. The device also includes an inertial navigation unit 6 that is configured to generate data regarding the three-space position of the device 10 as it moves through the pipeline 12. A memory 8 is provided to store programs executable by the processor, information collected by the device 10, and position information generated by the inertial navigation unit 6.

Figure 2:
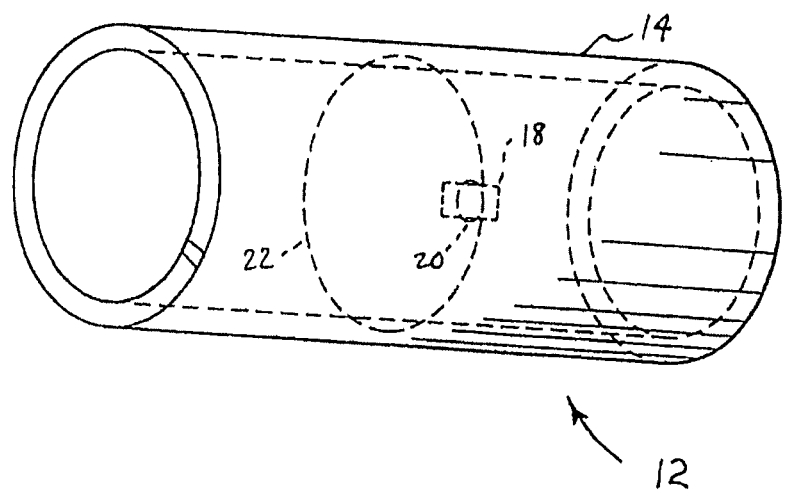
FIG. 2 schematically illustrates an RFID chip in a pipe.

Referring to FIG. 2, each pipe 14 of the pipeline 12 includes a RFID chip 18. The RFID chip 18 is placed on the inside of each pipe 14 protected from oil and rough handling, such as during installation, maintenance, repair or replacement. The RFID chip 18 may be attached to the inside of each pipe 14 and covered in a protective coating. It should be appreciated that the RFID chip 18 may be attached to each pipe 14 in another manner, such as embedded, or placed in a recess formed in each pipe 14.

The RFID chip 18 may be a passive or an active element. An antenna 20 is configured to receive RF signals from the RF transceiver 2 of the inspection device 10 and transmit RF signals back to the RF transceiver 2. In a passive RFID chip 18, such as the one shown in FIG. 2, the RF signal from the RF transceiver 2 is used to provide power to the RFID chip 18. The RFID chip 18 may include a supplemental antenna 22 that permits the RFID chip to receive a more powerful signal from the RF transceiver 2 and transmit a more powerful signal back to the RF transceiver 2 (than with the antenna 20 alone).

The size of the RFID chip 18 and the coating do not affect the operation of the pipe 14 or the inspection device 10. The RFID chip 18 may be programmed with the pipe manufacturer's information. The manufacturer's information (e.g. serial number, manufacture date, inner and outer diameter, length, material composition, etc.) may be programmed before, or after, each pipe 14 is delivered and/or installed in the pipeline 12. Installation information (installation date, the pipe installer, general topography of installation, nearest marker or pylon, etc.) may be programmed at the pipeline site. Programmers for RFID chips are commercially available and may be used to program the RFID chips 18.

Referring again to FIG. 1, the inertial navigation unit 6 is connected to the processor 4 and generates position information. The inertial navigation unit 6 may include a gyroscopic device, such as a traditional gyroscope, a ring laser gyroscope, or a digital gyroscope, that determines and indicates changes in the position of the inspection device 10. These gyroscopic devices are known and currently used, for example, in cruise missile technology, and provide very accurate location data. As the inspection device 10 moves through the pipeline 12, the inertial navigation unit 6 generates data indicative of the inspection device's movement from an initial starting position that may be stored in the memory 8. The position information generated by the inertial navigation unit 6 is stored in the memory 8. The inertial navigation unit 6 determines the inspection device's position in three dimensions (i.e. where it is along the pipe from its starting position, which direction it is heading, and how far above ground or below ground it is). The processor 4 may generate a three-dimensional map of the pipeline traversed by the inspection device 10.

The inspection device 10 may be placed into the pipeline 12 at an access point. As the inspection device 10 travels through the pipeline 12, it continuously gathers data from the RFID chips 18, including, for example, circumferential internal diameter dimensions, internal temperature, and surface finish. As the inspection device 10 moves through the pipeline 12, the RF transceiver 2 queries each RFID chip 18 and collects the stored data from each RFID chip 18, marking the time of the data collection (e.g. by a clock or timer in the inertial navigation unit 6) and the position of the data. The information collected is stored in the memory 8.

Figure 3:
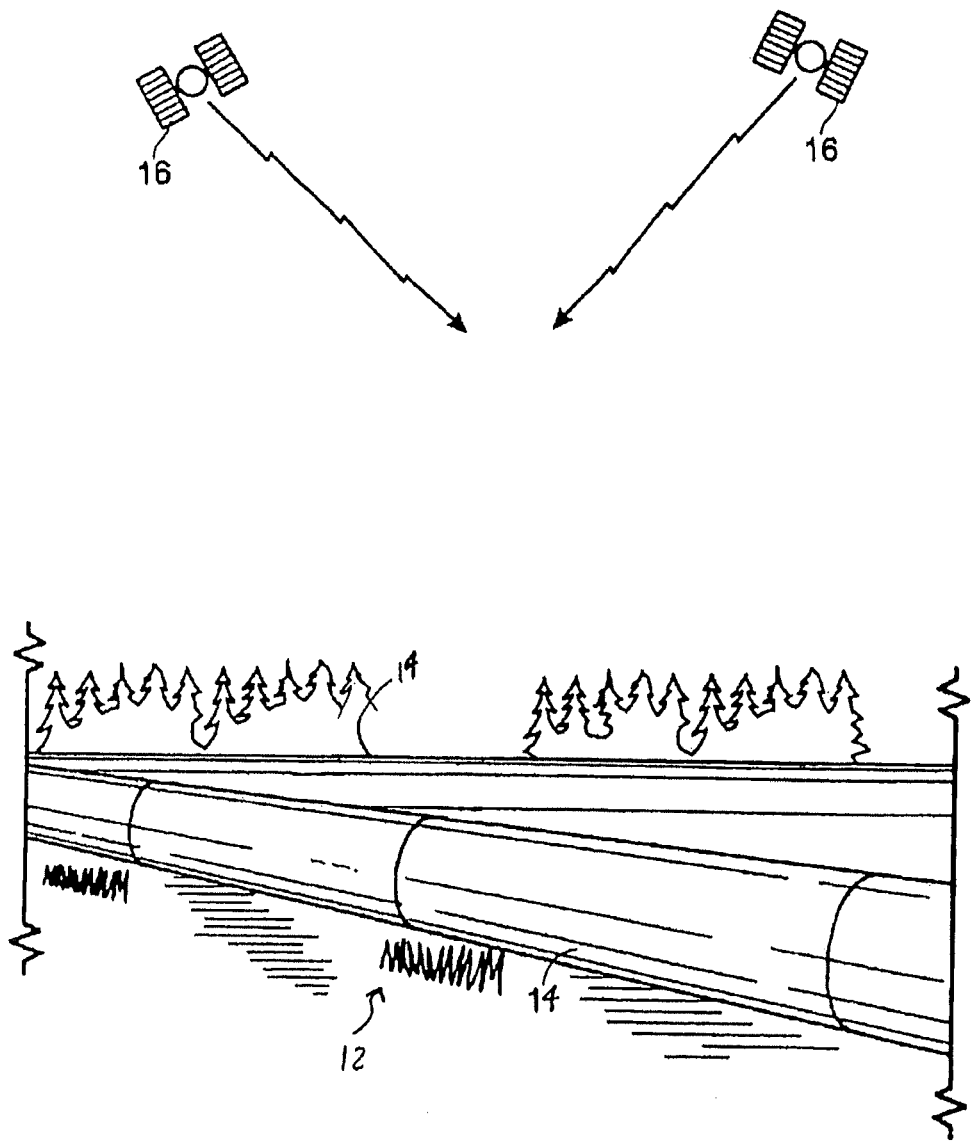
FIG. 3 schematically illustrates a pipeline in which the present invention is applicable.

Referring to FIG. 3, the inertial navigation unit 6 is aligned with GPS data received from a global positioning satellite(s) 16 that provides latitude and longitude information. The access point in the pipeline 12 is determined as the inspection device's initial position by the GPS data and the initial position is stored in the memory 8. The starting vertical position of the inspection device 10 may be provided by manual entry, for example after measuring the distance by hand. The GPS data will provide the height above or below sea level to establish a reference datum. The same data will be input when the inspection device 10 is taken out of the pipeline 12 to act a cross check to the inspection device's inertial navigation unit 6 readings. The location of the inspection device's retrieval position may also be determined by GPS data, and the retrieval position stored in the memory 8. The inspection device's retrieval position, as determined by GPS data, may also be cross checked with the three-dimensional position data generated by the inertial navigation unit 6. Any discrepancy between the retrieval position as determined by GPS data and the retrieval position as calculated from the position information generated by the inertial navigation unit 6 may be used to determine a drift of the inertial navigation unit 6 and provide an error correction.

The processor 4 synchronizes the data collected by the RF transceiver 2 with the three-space position information generated by the inertial navigation unit 6 and the time (e.g. GMT) of data collection to determine the position of each pipe 14 in the pipeline 12 that the inspection device 10 passed. The processor 4 synchronizes the pipe section physical condition information with the pipe's identity information and the pipe's location.

The synchronization of the pipe information and the position information allows the pipeline owner/operator to determine the existence of corrosion, the rate of corrosion, and the location of corrosion. This information allows the owner/operator to calculate or estimate an expected remaining life of each pipe in the pipeline. The information also provides an early warning of a potential for leakage. Coupled with environmental information (e.g. weather, soil composition, etc.), this information can result in improved installation parameters. The information also permits targeted pipe replacement or maintenance schedules, which saves time and money, and provides opportunities for training of installation crews.

The inspection device 10 may be sent through the pipeline in subsequent passes after the initial pass. By comparing the information collected on subsequent passes with the information collected on the initial pass, any shifting of pipes from their initial location may be determined. This comparison may thus provide early indication or warning of geological or seismic activity in the area where the pipeline is installed.

It should be appreciated that the inspection device may be any inspection device currently used, or yet developed, including devices known in the art as a pipeline inspection gauge or pig. For example, the inspection device may be a pig which is configured to locate and/or remove obstacles or obstructions, or a pig which is configured to inspect the pipeline condition, such as the joints between pipes, such as by the use of electrical brushes, and/or the condition of the pipe's interior surface, such as by the use of a self-tracking sensor mechanism. It should also be appreciated that although the pipeline has been shown as above ground in the instant application, the pipeline may be provided underground, and/or may pass over or under bodies of water. It should further be appreciated that although the present invention has been described as using GPS data for determining the inspection device's access and retrieval positions, any method or device useful for providing longitude and latitude information may be used, as well as any method or device useful for determining the positions should the access or retrieval positions be provided underground or underwater.

It should be even further appreciated that although the RFID's are shown as provided intermediate to the ends of each pipe, RFID's may also be provided at the end(s) of pipes, or at the joint between pipes. It should further be appreciated that the pipe having RFIDs may be a component of a new pipeline, or it may be a pipe installed as a replacement section of pipe in an existing pipeline. The pipe may also be a section of pipe in an existing pipeline that is modified to contain an RFID as described herein.

Although the invention has been described with reference to the embodiments disclosed herein, it should be appreciated that various modifications may be made without departing from the spirit and scope of the invention as defined by the appended claims.

What is claimed is:

1. A method for inspecting a pipeline comprising,
providing an inspection device to collect information relevant to the maintenance of the pipeline,
said device including an inspection device having an RF transceiver capable of receiving identity information from a radiofrequency identification device (RFID),
an inertial navigation unit capable of generating three-space position information,
a processor capable of synchronizing identity information from a RFID with position information; and
a section of pipe having a RFID with identity information for the section of pipe mounted on the wall of the pipe;
wherein said method further comprises configuring the RF transceiver of the inspection device to receive identity information from an RFID associated with a section of pipe;
introducing the inspection device into an access point in a pipeline containing a section of pipe having a RFID;
generating three-space position information indicative of the position of the inspection device in the pipeline;
collecting data from the RFID as the inspection device travels through the pipeline; and
synchronizing the identity information of the RFID associated with a section of pipe and the position information system of the inertial navigation unit.

2. The method of claim 1, wherein the inertial navigation unit comprises a gyroscopic device.

3. The method of claim 2, wherein the gyroscopic device comprises a digital gyroscope.

4. The method of claim 2, further comprising generating a three-space map of the location of a section of pipe from the synchronized identity and position information.

5. The method of claim 1, wherein the inspection device is configured to identify and/or remove obstacles and/or obstructions in a section of pipe.

6. The method of claim 1, wherein the inspection device is configured to inspect an interior surface of a section of pipe.

7. The method of claim 1, wherein the device is configured to inspect joints between sections of pipe in the pipeline.

8. The method of claim 1, further comprising adding, deleting, and/or editing identity information of a RFID mounted on a pipe.

9. The method of claim 1, wherein the identity information comprises inner diameter, outer diameter, length, manufacturer, date of manufacture, material composition, installation date, installer, surface finish, temperature, and/or internal pressure.

* * * * *